Sept. 30, 1952  H. R. TEAR  2,612,237
CENTRALIZED LUBRICATING SYSTEM
Filed April 15, 1950 2 SHEETS—SHEET 1
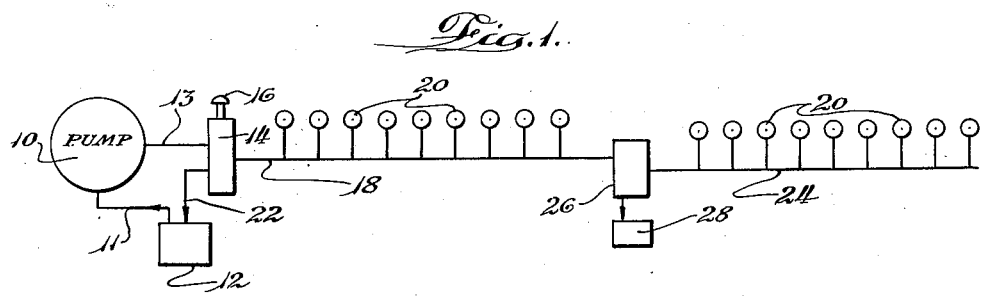
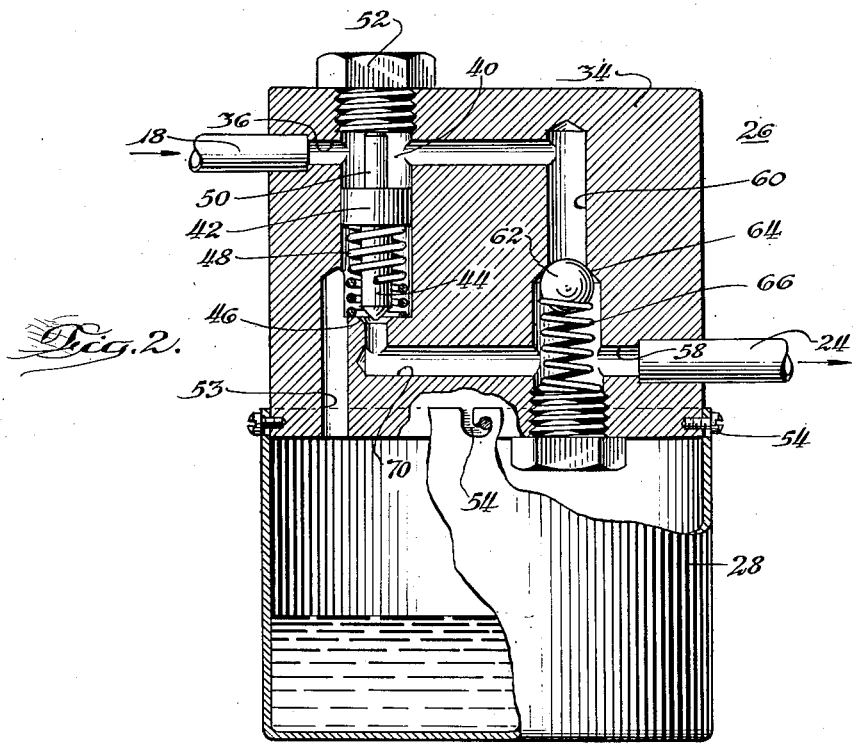

Patented Sept. 30, 1952

2,612,237

UNITED STATES PATENT OFFICE 2,612,237

CENTRALIZED LUBRICATING SYSTEM

Harry R. Tear, Evanston, Ill., assignor to Stewart-Warner Corporation, Chicago, Ill., a corporation of Virginia Application April 15, 1950, Serial No. 156,076

10 Claims. (Cl. 184—7)

This invention relates generally to centralized lubricating systems for intermittently supplying lubricant from a central source such as a high pressure pump to a number of remote bearings through charge measuring or feeder valves located at the bearings. The invention has particular application to lubricating systems having measuring or feeder valves which are operated by alternately supplying lubricant at high pressure to the valves and then substantially reducing or relieving the pressure. Application of pressure for a sufficient time operates the valves independently to supply measured charges of lubricant to the bearings, and reduction of the pressure permits the valves to return to normal in preparation for another lubricating cycle. Such measuring or metering valves require a feed conduit or pipe line for supplying lubricant from the source but do not require a separate return pipe. Lubricant under pressure is supplied to the measuring valves by connecting the conduit system with a high pressure pump. The pressure is relieved by disconnecting or stopping the pump and venting the conduit system to the atmosphere, whereupon a small amount of excess lubricant is forced out of the conduit system through the venting means. Usually the excess lubricant is allowed to drain back into the pump reservoir.

Because of the viscosity of the lubricant, the venting of the conduit system may require a substantial time interval. In lubricating systems having a large number of charge measuring valves and a long interconnecting conduit system, the venting time may impose an undesirable limitation upon the frequency with which lubricant charges may be supplied to the bearings. Furthermore, the venting time may set a practical limit upon the length of the conduit system and thereby upon the extensiveness of the lubricating system.

This invention provides valving apparatus which may be interposed between successive sections of the conduit system to provide rapid venting of the more remote section.

Thus it is an object of this invention to provide an improved single feed pipe lubricating system.

Another object is to provide means for rapidly venting remote sections of an extensive lubricating system.

A further object is to provide means whereby more extensive lubricating systems are practicable than heretofore.

A still further object is to provide means whereby an extensive lubricating system may be operated at frequent intervals.

Other objects and advantages of this invention and its underlying principles will appear from the following description together with the drawings, in which:

Fig. 1 shows diagrammatically an illustrative lubrication system embodying the principles of this invention;

Fig. 2 is an elevational sectional view of an illustrative valve apparatus which may form a part of the system of Fig. 1 to provide accelerated venting;

Figure 3:
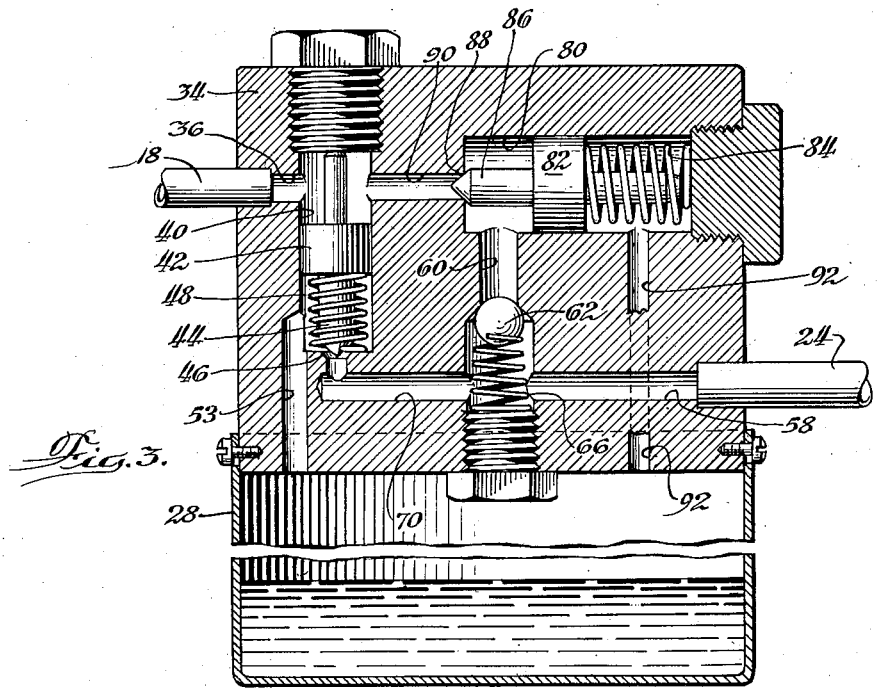
Fig. 3 is an elevational sectional view of a modified vent accelerating valve.

In Fig. 1 a lubricant pump 10 draws lubricant through an intake pipe 11 from a reservoir 12 and forces the lubricant under high pressure through an outlet pipe 13 to an admitting valve 14. The pump 10 may develop a maximum lubricant pressure of about 2500 pounds per square inch (p. s. i.), for example. The pump 10 may be operated manually or may be power driven.

The admitting valve 14 has a control plunger 16 which may be operated to admit lubricant from the valve 14 to a feed line 18. At regular intervals the control plunger 16 is operated either manually or by an automatic interval timing apparatus, not shown.

The lubricant flows outward through the feed line 18 and into a plurality of lubricant metering valves 20 branching from the line. The metering valves 20 are connected individually with bearings (not shown) to be lubricated. When lubricant under sufficient pressure is supplied to the valves 20, they operate to furnish predetermined quantities of lubricant to the bearings. The metering valves 20 may be constructed as described in the United States Patent No. 2,205,320 issued to Percy P. Teal, or as shown in the United States patent application of F. Schweisthal, Serial No. 570,961, filed January 1, 1945, now Patent Number 2,516,427, but other suitable valves may be used, of course.

After the valves 20 have been operated by lubricant pressure they are ineffective to supply additional charges of lubricant to the bearings until the lubricant pressure is reduced to a small amount. The reduction of pressure is accomplished by releasing the plunger 16 of the admitting valve 14, and the valve then disconnects the line 18 from the pump and connects the line 18 with a vent pipe 22 which drains back into the reservoir 12.

According to this invention a plurality of remote metering valves 20 are supplied by a second section 24 of the feed line which is connected with the remote end of the first section 18 of the feed line by a vent accelerating valve 26. When lubricant at high pressure is supplied by the pump 10 to the first section 18 of the line, the accelerating valve 26 admits lubricant to the second section 24. When the lubricant pressure is released on the first section 18 of the line, the second section 24 is vented by the accelerating valve 26 into an auxiliary reservoir or sump 28 open to the atmosphere. By providing additional vent accelerating valves 26, a third section of feed line (not shown) may be supplied from the remote end of the second section 24, a fourth section (not shown) may be supplied from the remote end of the third section, and so forth. The limit to the number of sections thus connected is determined by the pressure required to force lubricant to the end of the system, which depends upon the size of the tubing used in the feed line, the kind of lubricant, and the temperature.

Figure 4:
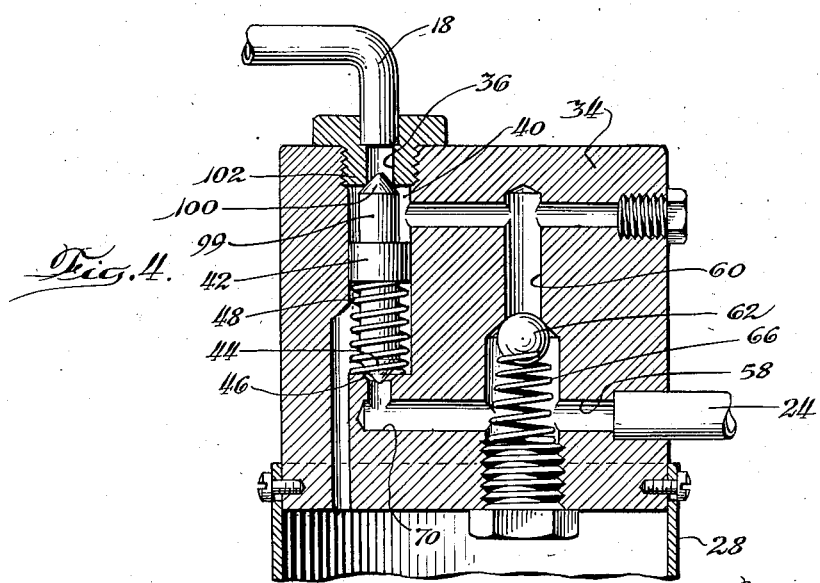
Fig. 4 is an elevational sectional view of another modified form of the vent accelerating valve.

Figs. 2, 3 and 4 illustrate three forms of vent accelerating valves having body blocks 34. In Fig. 2 the first section of feed line 18 communicates through an inlet 36 with a cylindrical chamber or bore 40 fitted with a piston 42. The piston 42 has a downwardly extending valve rod 44 having its lower end shaped to provide lubricant-tight engagement with a valve seat 46. The piston 42 is urged upwardly by a helical spring 48, and upward motion of the piston is arrested by engagement of a piston rod 50 with a plug 52 forming the upper wall of the chamber 40. The portion of the chamber 40 below the piston 42 communicates through an opening 53 with the reservoir 28, which is in the form of a sump cup open to the atmosphere and detachably secured to the valve 26 by bayonet connections 54.

The first section 18 of feed line communicates with the second section of line 24 through an outlet 58 and a passageway 60 closed by a ball check valve 62 which is urged upwardly against a valve seat 64 by a helical spring 66.

The second section 24 of the feed line communicates with the portion of chamber 40 below the piston 42 through a passageway 70 which is closed when the valve 44 engages its seat 46.

When lubricant under pressure is supplied by the pump 10 through the valve 14 to the first section 18 of feed line, the lubricant pressure rapidly builds up in the upper part of the chamber 40 and in the passageway 60. The pressure tends to force the piston 42 downward and thereby to compress the spring 48 and move the valve 44 into engagement with the seat 46. The lubricant pressure also tends to force the ball check valve 62 from its seat 64 and thereby to permit lubricant to flow into the second section 24 of the line. The springs 48 and 66 are designed with relation to the areas of the piston 42 and the ball check valve 62, respectively, so that a somewhat greater lubricant pressure is required to open the ball check valve 62 than is required to move the piston 42 downward to close the vent valve 46. Therefore, the passageway 70 extending from the second section of line 24 through the venting valve 46 to the lower part of the chamber 40 and thence to the reservoir 28 is closed before lubricant is admitted to the second line section 24 from the passageway 60. For example, the piston 42 and spring 48 may be proportioned to permit the vent valve to close at some low lubricant supply pressure, such as 15 p. s. i., while the spring 66 and ball check 62 are proportioned to permit the ball check to open at a somewhat higher pressure, such as 30 p. s. i. After the ball check valve 62 is opened, the lubricant flows freely into the second section of line 24 and lubricant pressure builds up in the line 24 and in the passageway 70 connecting with the vent valve 44. However, the pressure in the passageway 70 is ineffective to unseat the valve rod 44 because of the small area of the valve seat 46 compared with that of the piston 42.

When the first section 18 of the line is vented by operation of the valve 16, the lubricant pressure in the chamber 40 and the passageway 60 drops. The check valve 62 closes to prevent reverse flow of lubricant from the second section 24 of the line into the passageway 60.

The venting valve 44 remains closed until the force of the lubricant pressing on the piston 42 becomes less than the sum of the force of the spring 48 and the force of the lubricant pressing on the valve rod 44. For example, if the area of the piston 42 is twice that of the valve seat 46, the vent valve opens when the pressure in the chamber 40 approaches one-half the pressure in the passageway 70, and venting of the second section 24 of the line begins. Each time the line section 24 is vented, a small quantity of lubricant drains into the sump 28. At relatively infrequent intervals the sump 28 may be detached from the valve 26 and emptied into the main reservoir 12.

Fig. 3 illustrates a modified form of the vent accelerating valve illustrated in Fig. 2. In most respects the valve of Fig. 3 is similar to that of Fig. 2, and corresponding parts bear the same reference characters. However, an admitting valve chamber 80 is interposed between the venting valve chamber 40 and the passageway 60. A piston 82 is fitted into the chamber 80 and a helical spring 84 urges the piston to the left so that a valve rod 86 extending from the piston normally engages a seat 88 to close an opening 90 connecting the venting valve chamber 40 with the admitting valve chamber 80. The portion of the chamber 80 to the right of the piston 88 communicates with the reservoir 28 through a drain passageway 92.

When lubricant is supplied to the line 18, lubricant pressure builds up in the chamber 40 and the opening 90. The spring 84 and the valve seat 88 are proportioned so that a relatively high lubricant pressure, such as about 1200 p. s. i., is required to unseat the valve rod 86. The spring 48 and the piston 42 are proportioned so that a relatively small lubricant pressure, such as 150 p. s. i., moves the piston 42 downward to seat the venting valve rod 46 and thereby to cut off communication between the second section 24 of feed line and the sump 28. The check valve spring 66 and ball check valve 62 are proportioned so that the check valve 62 unseats at a relatively small differential lubricant pressure, such as 15 p. s. i. Thus the venting valve 44 closes when the lubricant pressure in the chamber 40 reaches 150 p. s. i., and the admitting valve 86 opens rapidly when the lubricant pressure reaches about 1200 p. s. i., since the pressure is applied to the large area of the piston 82 as soon as the valve 86 is unseated. Of course, this latter pressure is also effective to open the ball check valve 62 and permit lubricant freely to flow to the second section 24 of the line. The pressure which builds up in the passageway 70 is ineffective to unseat the vent valve 44 because the area of the seat 46 is less than the area of the piston 42.

When the lubricant pressure is released on the line 18, the pressure in the chamber 40 and the opening 90 decreases. The ball check valve 62 closes to prevent reverse flow of lubricant, as soon as forward flow ceases, as a result of the fact that the pressure in the passageway 60 rapidly drops below the pressure in the second section of feed line 24. However, because of the difference in the areas of the piston 42 and the venting valve seat 46, the venting valve 44 does not open until the pressure in the chamber 40 drops to some predetermined fraction of the pressure in the second section 24 of the line.

Although a relatively great pressure is required to open the valve 86 because of the relatively small area of the valve seat 88, a much smaller pressure is sufficient to hold the valve 86 open because as soon as the valve is open the lubricant pressure is applied to the piston 82 which has a relatively great area. For example, the valve 86 may not close until a pressure such as 100 p. s. i. is reached.

Before opening, the admitting valve 86 permits a high pressure to develop in the chamber 40 for positive closing of the venting valve 44. This construction of the admitting valve 86 minimizes the possibility of loss of lubricant from the line 24 to the reservoir 28, during the interval that the pressure in the line section 18 is being built up. Any lubricant which leaks around the piston 82 drains into the reservoir 28 through the passageway 92.

In Fig. 4 another modified form of valve apparatus is illustrated, and corresponding parts bear the same reference characters as in Fig. 1. The piston 42, venting valve 44, and ball check valve 62 are substantially as described in connection with Fig. 1, except as described hereinafter. The passageway 60 communicates directly with the upper portion of the chamber 40. However, the inlet 36 from the first section 18 of the line normally is cut off from the chamber 40 by engagement of an admitting valve 100 at the end of a piston rod 99 which extends from the top of the piston 42, with a plug 102 which forms a seat for the valve. The spring 48 and the effective area of the valve 100 are proportioned so that a relatively high lubricant pressure, such as 1200 p. s. i., must develop in the line 18 before the valve 100 is unseated and the lubricant is admitted to the chamber 40. After valve 100 opens and lubricant is admitted to the chamber 40, the lubricant pressure is exerted on piston 42 which has a considerably greater area than the valve 100, and the piston is "popped" downward rapidly to force the venting valve 44 against its seat 46. A relatively small pressure upon the piston 42 is sufficient to hold the venting valve 44 closed.

The check valve spring 66 and the check valve 62 are proportioned so that the valve 62 opens under a relatively small differential pressure such as 15 p. s. i., and after lubricant is admitted to the chamber 40 and to the passageway 60 it flows freely past the check valve 62 to the second section 24 of the line. The pressure in the line 24 and the passageway 70 may build up to substantially the same value as the pressure in the section 18 of the line without opening the vent valve 44 because of the relatively small effective area of the vent valve compared with that of the piston 42.

Closure of the check valve 62, when the pressure in the line 18 is released, prevents the pressure in the line section 24 from being maintained in the chamber 40 and permits the pressure in the chamber to drop due to the return flow of lubricant into the line section 18. The valve 44 opens quickly when the pressure in the chamber 40 drops to a predetermined fraction of the pressure in the line section 24, and lubricant in the line 24 may then flow freely to the reservoir 28. The exact pressure differential at which the venting valve 44 opens is determined by the relative areas of the piston 42 and the valve seat 46, and also the strength of the valve spring 48.

When a lubrication system, such as that illustrated in Fig. 1 is vented, the pressure in the section 18 of the line drops approximately exponentially, rapidly at first but much more slowly in the latter stages. Thus the pressure in the remote end of the line 18 drops rapidly to a value which permits the opening of the vent valve 44. Of course, when the vent valve 44 opens, the pressure at the inlet end of the second section 24 of the line drops immediately substantially to atmospheric pressure and the venting of the second section proceeds much more rapidly than if the rate of venting were limited by the rate of pressure reduction in the remote end of the section 18 of the line. It will be clear that by the application of the principles of this invention a single feed line lubrication system may be relatively extensive before the venting time of the system becomes undesirably great. Lubricant may be supplied to the bearings at relatively frequent intervals with the assurance that the feed line is properly vented and the metering valves 20 thereby are properly reconditioned for operation. A lubrication system according to this invention operates dependably even under severe service conditions.

I have disclosed this invention by describing certain illustrative embodiments, but it will be clear to those skilled in the art that the principles of this invention may be applied in equivalent ways obtaining substantially the same results but differing in detail from the embodiments described herein. Therefore, the details of the above disclosure should not be construed to limit the scope of this invention except as set forth in the appended claims which are intended to be a complete and concise statement of the patentable scope of this invention.

I claim:

1. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a venting valve connected between the second conduit and the vent outlet normally providing a relief passage to transmit lubricant from the second conduit to the vent outlet, a pressure sensitive device in the valve to close the latter, means connecting the device to the outlet of the first conduit for closing the valve in response to pressure therein, and means including a check valve connecting the outlet of the first conduit to the second conduit to transmit lubricant under a substantial pressure from the first conduit to the second, but to prevent reverse flow of lubricant.

2. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a venting valve connected between the second conduit and the vent outlet, a spring in the valve normally opening the latter to provide a relief passage to transmit lubricant from the second conduit to the vent outlet, a pressure sensitive device in the valve to close the latter, means connecting the device to the outlet of the first conduit for closing the valve in response to pressure therein, and means including a check valve connecting the outlet of the first conduit to the second conduit to transmit lubricant under a substantial pressure from the first conduit to the second, but to prevent reverse flow of lubricant.

3. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a venting valve connected between the second conduit and the vent outlet normally providing a relief passage to transmit lubricant from the second conduit to the vent outlet, a differential pressure sensitive device in the valve to operate the latter, means connecting the device to the outlet of the first conduit for closing the valve in response to an excess of pressure therein over the pressure in the second conduit, the differential pressure sensitive device being arranged to open the valve in response to a substantial excess of pressure in the second conduit over that in the first conduit, and means including a check valve connecting the outlet of the first conduit to the second conduit to transmit lubricant under a substantial pressure from the first conduit to the second, but to prevent reverse flow of lubricant.

4. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a venting valve connected between the second conduit and the vent outlet normally providing a relief passage to transmit lubricant from the second conduit to the vent outlet, a pressure sensitive device in the valve to close the latter, means connecting the device to the outlet of the first conduit for closing the valve in response to pressure therein, and means including a valve connecting the outlet of the first conduit to the second conduit to transmit lubricant under a substantial pressure from the first conduit to the second, the last mentioned valve including a valve closing plug arranged to be opened by pressure in the first conduit and a spring urging the plug to valve closing position.

5. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a venting valve connected between the second conduit and the vent outlet normally providing a relief passage to transmit lubricant from the second conduit to the vent outlet, a pressure sensitive device in the valve to close the latter, an admitting valve having an inlet and an outlet end, the inlet end being connected to the outlet of the first conduit, the pressure sensitive device being connected to one of the ends of the admitting valve, the admitting valve including a valve plug movable by predetermined pressure in the inlet end to open the valve and a spring urging the plug to closed position, and a check valve connected between the outlet end of the admitting valve and the second conduit to transmit lubricant from the first conduit to the second.

6. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a venting valve connected between the second conduit and the vent outlet normally providing a relief passage to transmit lubricant from the second conduit to the vent outlet, a pressure sensitive device in the valve to close the latter, means connecting the device to the outlet of the first conduit for closing the valve in response to pressure therein, an admitting valve having an inlet connected to the outlet of the first conduit, and a check valve connected between the admitting valve and the second conduit to transmit lubricant to the second conduit, the admitting valve having a valve closing plug arranged to be opened by predetermined pressure in the first conduit and a spring urging the plug to closed position, the admitting valve spring being strong enough to hold the admitting valve closed until after the venting valve is closed.

7. A centralized lubricating system for supplying lubricant periodically to a plurality of bearings, comprising a first plurality of measuring valves individually connected with some of the bearings, the measuring valves being operable by successive application and release of lubricant pressure, a first conduit connected with the first plurality of measuring valves, the first conduit having an inlet and a remote outlet, means alternately to apply and release lubricant pressure at the inlet of the first conduit, a second plurality of similar measuring valves located remotely from the inlet of the first conduit, a second conduit connected with the second plurality of measuring valves, a vent outlet, a combined venting and admitting valve providing a first valved passage connected between the second conduit and the vent outlet and a second valved passage connected with the outlet of the first conduit, a pressure responsive movable member having a vent valving part and an admitting valve plug at its opposite ends positioned to close the respective first and second passages alternately, a spring urging the member to a position for closing the second passage, the member being shiftable by predetermined pressure in the outlet of the first conduit to a position for closing the first passage, and a check valve connected between the second passage and the second conduit to transmit lubricant thereto.

8. In a centralized lubricating system having a plurality of feeder valves operable by successive application and release of lubricant pressure, a lubricant conduit connected to the valves, and an intermittently operable source of lubricant pressure; a vent outlet, a venting valve connected between the conduit and the vent outlet normally providing a relief passage to transmit lubricant from the conduit to the vent outlet, a pressure sensitive device in the valve to close the latter, an admitting valve having an inlet end and an outlet end, the inlet end being connected to the source of lubricant pressure, the pressure sensitive device being connected to one of the ends of the admitting valve, the admitting valve including a valve plug movable by predetermined pressure in the inlet end to open the valve and a spring urging the plug to closed position, and a check valve connected between the outlet end of the admitting valve and the conduit, to transmit lubricant thereto.

9. In a centralized lubricating system having a plurality of feeder valves operable by successive application and release of lubricant pressure, a lubricant conduit connected to the valves, and an intermittently operable source of lubricant pressure; a vent outlet, a venting valve connected between the conduit and the vent outlet normally providing a relief passage to transmit lubricant from the conduit to the vent outlet, a pressure sensitive device in the valve to close the latter, means connecting the device to the source of lubricant pressure for closing the valve in response to pressure therein, an admitting valve having an inlet connected to the source of lubricant pressure, and a check valve connected between the admitting valve and the conduit to transmit lubricant thereto, the admitting valve having a valve closing plug arranged to be opened by predetermined pressure of the source and a spring urging the plug to closed position, the admitting valve spring being strong enough to hold the admitting valve closed until after the venting valve is closed.

10. In a centralized lubricating system having a plurality of feeder valves operable by successive application and release of lubricant pressure, a lubricant conduit connected to the valves, and an intermittently operable source of lubricant pressure; a vent outlet, a combined venting and admitting valve providing a first valved passage connected between the conduit and the vent outlet, and a second valved passage connected with the source of lubricant pressure, a pressure responsive movable member having a vent valving part and an admitting valve plug at its opposite ends positioned to close the respective first and second passages alternately, the spring urging the member to a position for closing the second passage, the member being shiftable by predetermined pressure of the source to a position for closing the first passage, and a check valve connected between the second passage and the conduit to transmit lubricant thereto.

HARRY R. TEAR.

REFERENCES CITED

The following references are of record in the file of this patent:

UNITED STATES PATENTS

| Number | Name | Date |
| --- | --- | --- |
| 212,972 | Osgood | Mar. 4, 1879 |
| 1,795,034 | Murphy | Mar. 3, 1931 |
| 2,206,335 | Rotter | July 2, 1940 |
| 2,512,478 | Callejo | June 20, 1950 |